United States Patent [19]
Fujii et al.

[11] Patent Number: 5,437,043
[45] Date of Patent: Jul. 25, 1995

[54] INFORMATION PROCESSING APPARATUS HAVING A REGISTER FILE USED INTERCHANGEABLY BOTH AS SCALAR REGISTERS OF REGISTER WINDOWS AND AS VECTOR REGISTERS

[75] Inventors: Hiroaki Fujii, Kokubunji, Japan; Naoki Hamanaka, Palo Alto, Calif.; Teruo Tanaka, Hachoiji, Japan; Yasuhiro Inagami; Yoshiko Tamaki, both of Kodaira, Japan

[73] Assignee: Hitachi, Ltd., Tokyo, Japan

[21] Appl. No.: 979,327

[22] Filed: Nov. 20, 1992

[30] Foreign Application Priority Data

Nov. 20, 1991 [JP] Japan .................................. 3-304462

[51] Int. Cl.⁶ .......................... G06F 9/26; G06F 9/28; G06F 9/30; G06F 9/40
[52] U.S. Cl. .................... 395/800; 364/229; 364/229.5; 364/232.21; 364/232.23; 364/240.2; 364/247.6; 364/252.3; 364/262.4; 364/262.9; 364/263.3; 364/255.8; 364/DIG. 1; 364/DIG. 2
[58] Field of Search ............... 395/800, 375, 500, 325, 395/400, 425, 600, 650, 575, 250; 364/DIG. 1, DIG. 2

[56] References Cited

U.S. PATENT DOCUMENTS

| | | | |
|---|---|---|---|
| 5,123,095 | 6/1992 | Papadopoulos et al. | 395/375 |
| 5,179,674 | 1/1993 | Williams et al. | 364/DIG. 1 |
| 5,226,142 | 7/1993 | Vegesna et al. | 395/425 |

*Primary Examiner*—Alyssa H. Bowler
*Assistant Examiner*—Daniel Pan
*Attorney, Agent, or Firm*—Antonelli, Terry, Stout & Kraus

[57] ABSTRACT

An arrangement having a register file having registers greater in number than those which are designated by an instruction, a pipeline ALU, a current window pointer and window number modifier operating in a register window mode, an element counter and address counter operating in a vector register mode, and register determining circuits for determining physical register numbers from the register numbers designated by an instruction in one of the two modes. Each register determining circuit has a first register determining circuit using an output of the window number modifier, for using the register file as a register window configuration, and a second register determining circuit using an output of the element counter, for using the register file as a vector register configuration. Physical registers of the register file are used as scalar registers in the register window mode, and used as vector registers in the vector register modes.

27 Claims, 11 Drawing Sheets

FIG. 6

220 BLOCK ASSIGN TABLE

| W#<br>R#(U) | 0 | 1 | 2 | 3 |
|---|---|---|---|---|
| 00 | BLK0 | BLK0 | BLK0 | BLK0 |
| 01 | BLK1 | BLK4 | BLK7 | BLK10 |
| 10 | BLK2 | BLK5 | BLK8 | BLK11 |
| 11 | BLK10 | BLK1 | BLK4 | BLK7 |

(NOTES)
W# : WINDOW NUMBER
R#(U) : UPPER 2 BITS OF
LOGICAL REGISTER NUMBER

FIG. 8

310 BLOCK ASSIGN TABLE

| E#<br>R#(U) | 0 | 1 | 2 | 3 |
|---|---|---|---|---|
| 00 | BLK0 | BLK0 | BLK0 | BLK0 |
| 01 | BLK1 | BLK4 | BLK7 | BLK10 |
| 10 | BLK2 | BLK5 | BLK8 | BLK11 |
| 11 | BLK3 | BLK6 | BLK9 | BLK12 |

(Notes)
  E# : ELEMENT NUMBER
  R#(U) : UPPER 2 BITS OF
         LOGICAL REGISTER NUMBER

FIG. 10

INFORMATION PROCESSING APPARATUS HAVING A REGISTER FILE USED INTERCHANGEABLY BOTH AS SCALAR REGISTERS OF REGISTER WINDOWS AND AS VECTOR REGISTERS

BACKGROUND OF THE INVENTION

1. Field of the Invention

The present invention relates to a data processor having registers greater in number than those which can be designated by a program instruction. More particularly, the present invention relates to an information processing apparatus which uses a plurality of register windows interchangeably.

2. Description of the Related Art

In order to improve the performance of a processor, it is necessary to speed up the operation of an arithmetic and logic unit of the processor and to improve the data transfer performance between the processor and a memory (main storage).

It is not always easy to improve the data transfer performance because of a data transfer delay caused by wirings and a limitation of the number of LSI pins connected to data transfer paths. Therefore, the data transfer performance becomes inferior to the arithmetic and logic operation performance. This bottleneck of the inferior data transfer performance hinders using the maximum performance of the arithmetic and logic unit. This problem is associated with not only microprocessors but also large computers. It becomes a serious problem particularly for large scale computations which processes a great amount of data.

Several attempts have been made to reduce the number of data transfers between a processor and a memory. Most of these attempts are directed to registers which store computation results and can be designated by an instruction. Typically, the following two conventional techniques are known.

The first conventional technique is called a register window technique. According to this technique, there are provided within a processor a plurality of registers (scalar registers) for storing data greater in number than those which can be designated by a register designation field of an instruction (scalar instruction). These registers equal to the number of registers which can be designated by a register designation field of a scalar instruction forms one group, and many of such groups are used interchangeably.

This first conventional technique is used by, for example, the SPARC architecture developed by Sun Microsystems, Inc., in U.S.A. For example, refer to J. L. Hennesy & D. A. Patterson, "Computer Architecture: A Quantitative Approach", pp. 450–451 (Morgan Kaufmann Publishers, Inc. (1990)).

With this technique, a plurality of scalar registers belonging to a register window currently used by a program are selected by register numbers designated by an instruction. As a result, a number of registers can be used greater than when register windows are not used.

With this technique, if the number of data storage registers provided within the processor is increased, the number of operations of saving an intermediate calculation result in the main storage and the number of operations of thereafter reading the intermediate calculation result from the main storage can be reduced, thereby reducing the number of data transfers between the memory and processor.

According to the second conventional technique, there are provided within a processor a plurality of vector registers capable of storing vector data comprised of a plurality of data, and vector registers in use are designated by an instruction. This conventional technique is used by many of today's super-computers. For example, refer to pp. 351–355 of the above-cited document.

With this conventional technique, each vector register stores vector data comprised of a plurality of data, and so an extremely large amount of data can be stored using a plurality of vector registers. The number of data transfers between the memory and processor can be reduced correspondingly. With the second conventional technique, it is possible to provide a plurality of additional scalar registers and selectively use these scalar registers designated by a scalar instruction, or to designate one scalar register and one vector register and perform a calculation using the scalar data in the scalar register and each of a plurality of vector element in the vector register.

SUMMARY OF THE INVENTION

With the above-described first technique, scalar registers can be used as the scalar registers constituting register windows. However, vector registers cannot be used as opposed to the case of the second conventional technique.

With the above-described second conventional technique, although vector registers can be used, scalar registers cannot be used as the scaler registers constituting register windows.

It is therefore desirable to provide within a processor a plurality of registers which can be used as scaler registers constituting register windows and can be used also as vector registers.

It is an object of the present invention to provide a processor having a plurality of registers which can be used as scalar registers constituting register windows and can be used also as element registers of vector registers capable of being designated by an instruction which uses vector registers.

It is another object of the present invention to provide a processor having a plurality of registers each of Which can be used as a scalar register and can be used also as an element register of a vector register.

In order to achieve the above objects, a processor according to the present invention comprises:

a plurality of registers;

a designating circuit means for designating the number of a register window in use among a plurality of register windows;

first access circuit connected to the plurality of registers and to the designating circuit and responsive to a first instruction designating at least one register number, for selectively accessing one register among the plurality of registers, said one register being assigned a combination of the designated register window number and the designated register number;

second access circuit responsive to a second instruction designating at least one register number, for selectively accessing one register group among the plurality of registers, said one register group being assigned the designated register number as a register group number; and activation controlling circuit for activating one of said first and second access circuits.

According to a preferred embodiment of the present invention, the register group is used as vector registers for storing a plurality of vector elements of vector data.

BRIEF DESCRIPTION OF THE DRAWINGS

FIG. 6 shows the details of the block assign table to be used by the first register determining circuit shown in FIG. 5;

FIG. 8 shows the details of the block assign table to be used by the second register determining circuit shown in FIG. 7;

FIG. 10 shows the relationship between logical registers to be designated by instructions and physical registers in the register file assigned to logical registers, when the processor shown in FIG. 1 is used in a vector processing mode of a vector register mode.

DESCRIPTION OF THE PREFERRED EMBODIMENTS

Preferred embodiments of the present invention will now be described with reference to the accompanying drawings.

(1) Outline of Processor

Figure 1:
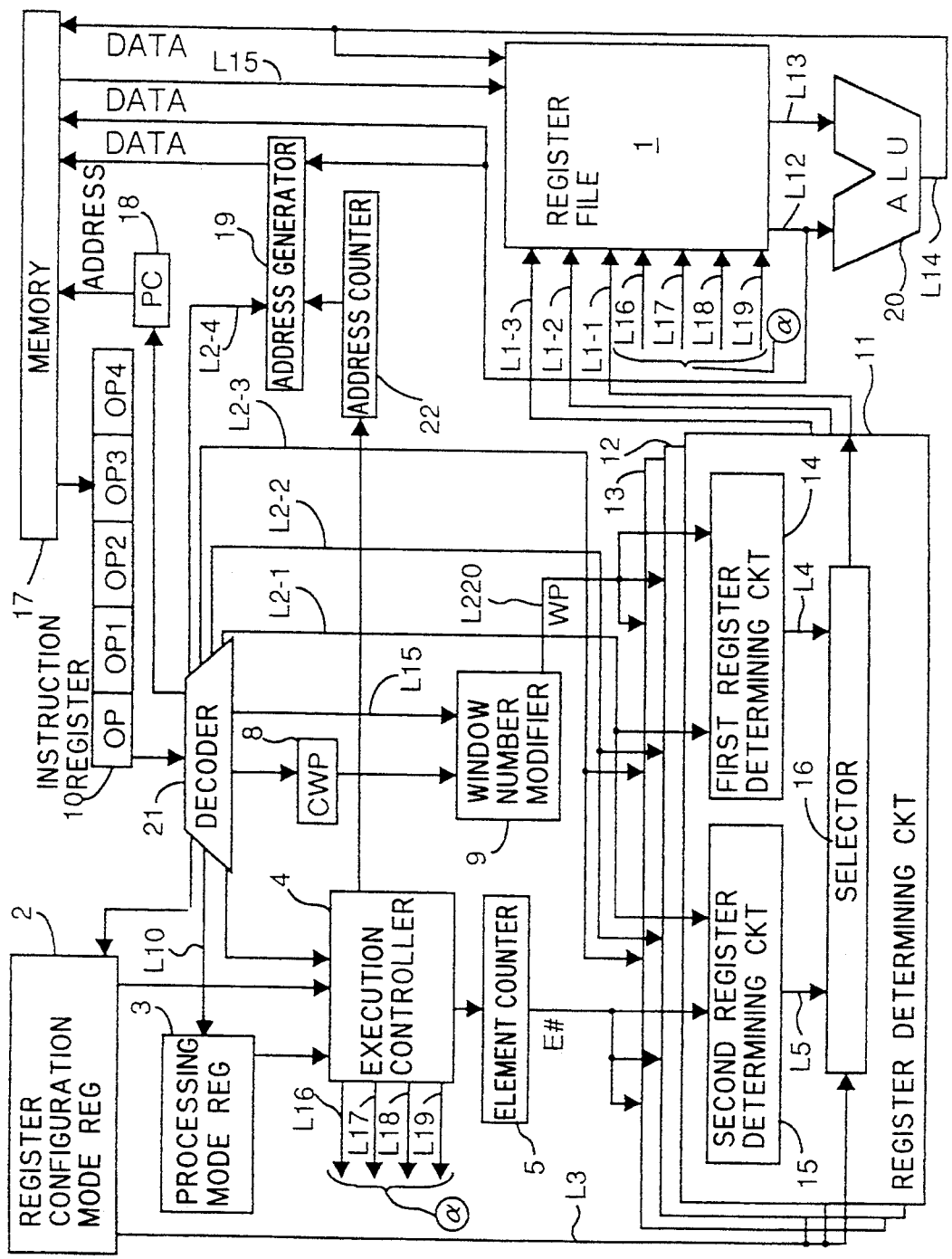
FIG. 1 is a block diagram showing the structure of a processor according to an embodiment of the present invention.

FIG. 1 is a block diagram showing the details of an embodiment of the processor according to the present invention, and a memory to be used as a main storage of the processor.

Referring to FIG. 1, the memory 17 to be used as the main storage of the processor stores therein instruction sequences of programs to be executed by the processor and data to be used by the instruction sequences.

A program counter 18 sequentially generates addresses of programs to be read from the memory 17, and supplies them to the memory 17.

An instruction register 10 stores a read-out instruction. A decoder 21 decodes an instruction to generate various signals necessary for the execution of the instruction, such as a signal for controlling the program counter 18, and transfers the contents of fields of the instruction format to other circuits within the processor.

An execution controller for instructions (hereinafter called as an instruction execution controller) 4 generates control signals necessary for the execution of an instruction stored in the instruction register 10, the control signals being of a type different from the signals generated by the decoder. For example, such control signals include a read/write control signal for a register file 1 and a control signal for processing vector data.

A pipeline arithmetic and logic unit (ALU) 20 executes an arithmetic and logic operation in a pipeline manner.

The register file 1 has a number of registers which store data to be supplied to ALU 20, result data supplied from ALU 20, or address data to be used by an address generator 19 to be described later.

In this embodiment, these registers are greater in number than those which can be designated by each register field of an instruction stored in the instruction register 10, as will be later described in detail.

In this embodiment, the register file 1 can be used in a selected one of a plurality of register configuration modes and in a different register configuration manner. In this embodiment, as register configuration modes, there are provided a vector register mode for configuring the register file 1 as vector registers, and a register window mode for configuring the register file 1 as register windows. Also in this embodiment, as processing modes, there are provided a vector processing mode and a scalar processing mode. These processing modes are made valid when the register configuration mode is the vector register mode. In FIG. 1, reference numeral 2 represents a register for storing the register configuration mode, and reference numeral 3 represents a register for storing the processing mode.

A current window pointer (CWP) register 8 stores the number of a register window which is currently used while the processor operates in the register window mode.

A register window pointer or number (register WP) modifier 9 generates the window number which is one number before or after the current register window number supplied from the CWP register 8. An output from the window number modifier 8 is used by register determining circuits 11–13 when the register configuration mode is the register window mode.

In response to one of a plurality of register numbers stored in the instruction register 10 and supplied from the decoder 21, each of the register determining circuits 11–13 determines the number of a register to be used a scalar register corresponding to the register number supplied from the decoder 21, or determines the numbers of registers to be used as element registers constituting a vector register corresponding to the register number supplied from the decoder 21.

In this embodiment, the characteristic feature resides in that each register in the register file 1 is used either as a scaler register or as one of a plurality of element registers constituting a vector register.

As will be described later, when the register configuration mode is the register window mode, each of the register determining circuits 11–13 determines as a scalar register a register which belongs to a register block in a window designated by an instruction of a program and which is assigned a register number designated by the instruction. When the register configuration mode is the vector register mode and the processing mode is the vector processing mode, each circuit determines a plurality of registers to be used as vector element registers constituting a vector register, and when the processing mode is the scalar processing mode, each circuit determines a register to be used as a scaler register from the register file 1.

In FIG. 1, reference numeral 5 represents an element counter for sequentially outputting element numbers of a vector data during processing vector data. The element numbers are used by the register determining circuits 11–13 when the processor operates in the vector register mode.

An address generator 19 generates addresses of data to be loaded or stored and supplies them to the memory 17, when using a load instruction for loading vector data or scalar data from the memory 17 to the register file 1, or using a store instruction for storing vector data or scalar data from the register file 1 to the memory 17.

(2) Instructions to be Used by the Embodiment

Prior to giving the detailed description of the structure and operation of the embodiment, instructions to be used by the embodiment will be described.

The format of a typical instruction using register operands and executable by the embodiment is shown in the instruction register 10 of FIG. 1. OP represents an operation code indicating the type of processing the instruction request. OP1–OP4 represent fields for designating the numbers of registers to be used for the instruction execution, the number of a register to be used for storing the instruction execution result, and the like. The contents of each field are different for each instruction.

In this embodiment, it is possible to execute a register operation instruction for performing a calculation of operands in first and second registers and storing the result in a third register. For the register operation instruction, OP1, OP2, and OP3 fields designate the first, second, and third registers, respectively.

In this embodiment, the same format can be used both for a register operation instruction using scalar registers in the register window mode and for a register operation instruction using vector registers in the vector register mode. It is also possible to handle two register numbers designated by an operation instruction as vector register numbers, and the other register number as scalar register numbers. Namely, in this embodiment, the same instruction format can be used for a scalar operation instruction which uses a plurality of scalar registers, a vector operation instruction which uses a plurality of vector registers, and a register operation instruction which uses one or two vector registers and one scalar register.

In this embodiment, the register numbers designated by a register operation instruction stored in the instruction register 10 shown in FIG. 1 are handled either as a scalar register number or as a vector register number, depending upon the contents of the register configuration mode register 2 and processing mode register 3.

In this embodiment, it is possible to execute a load instruction for loading data in the memory 17 at a predetermined address in a register, and a store instruction for storing data in a register in the memory 17 at a predetermined address. The data may be scalar data or vector data. An instruction having the same format can be used for both the scalar and vector data. Generally, the vector data comprises elements stored in the memory 17 at a predetermined address interval. This address interval is also called a stride. Generally, there are various strides of vector data. For the simplification of description, the stride of vector data is assumed to be "1" in this embodiment. Namely, it is assumed that vector data elements are stored at consecutive storage addresses. The present invention is not intended to be limited to the stride "1", but it is easy to modify the embodiment so as to allow the processing of vector data of an optional stride.

For the load or store instruction, the OP1 to OP4 fields designate the number of a register (usually called a base register) for storing a base value to be used for the calculation of an address at the load or store position, a shift value to be used for this calculation, and the number of a register to be loaded or the number of a register for storing data. The field OP4 is not directly related to the present invention, and so the description thereof is omitted. If the data to be loaded or stored by the load or store instruction is vector data, an address calculated by such address information is an address of the start element of the vector data.

The embodiment processor can execute other instructions using register operands. However, the description of such instructions are omitted for the simplification of description. Instructions such as a mode setting instruction not accessing the register file 1 can also be used which will be described later.

In this embodiment, it is assumed that each field of the register operation instruction, load instruction, and store instruction is made of 5 bits. Therefore, an instruction to be used with this embodiment can designate 32 registers at a maximum. Also in this embodiment, each vector data is assumed to have 4 elements, and so the total number of windows is assumed 4. It is obvious that the present invention is not limited to such assumed values.

The embodiment will further be detailed below.

(3) Outline of Structure of Register File 1 and Method of Using It (3-1) Outline of Structure of Register File 1

Figure 2:
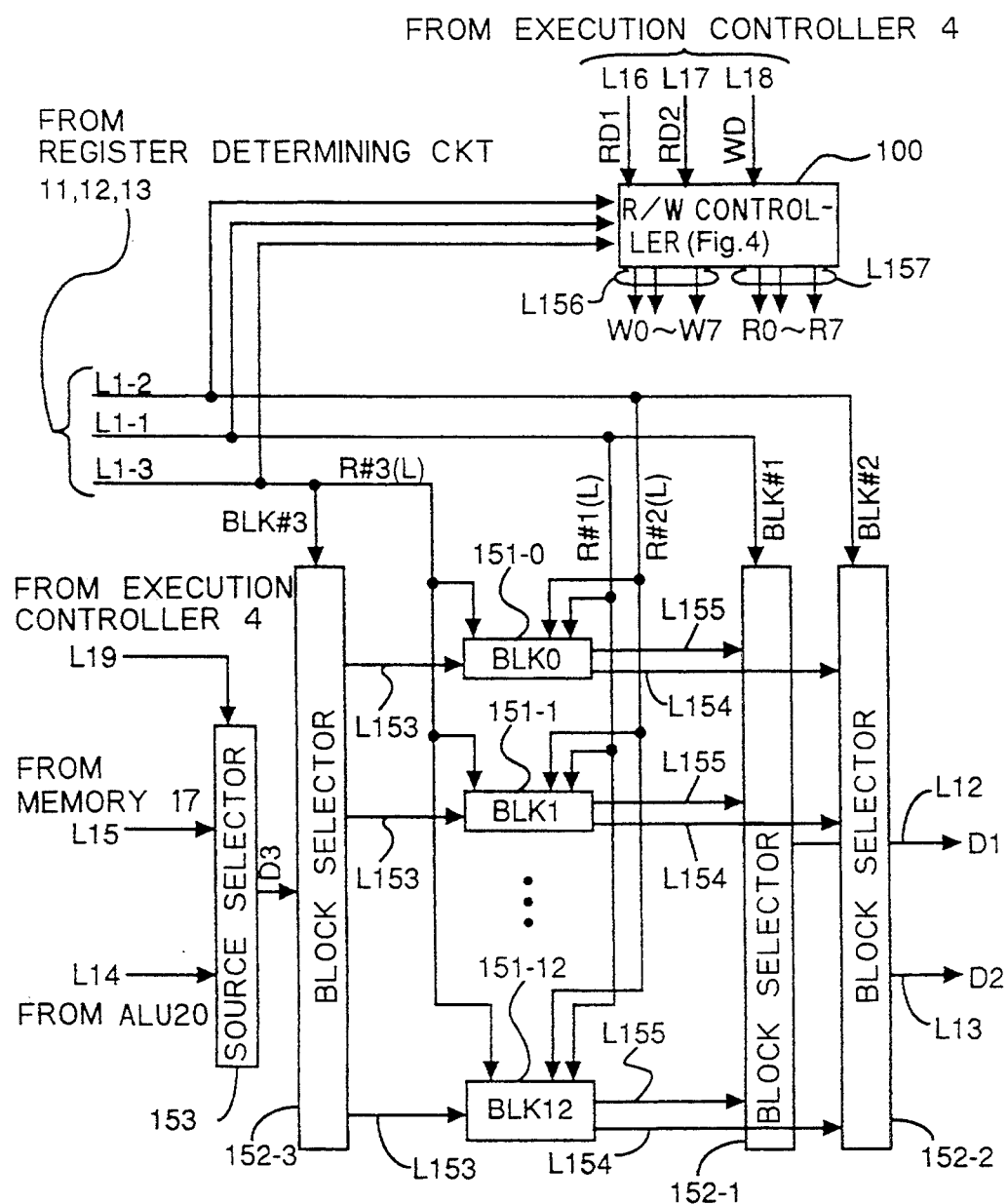
FIG. 2 a block diagram showing the structure of the register file to be used by the processor shown in FIG. 1.
Figure 3:
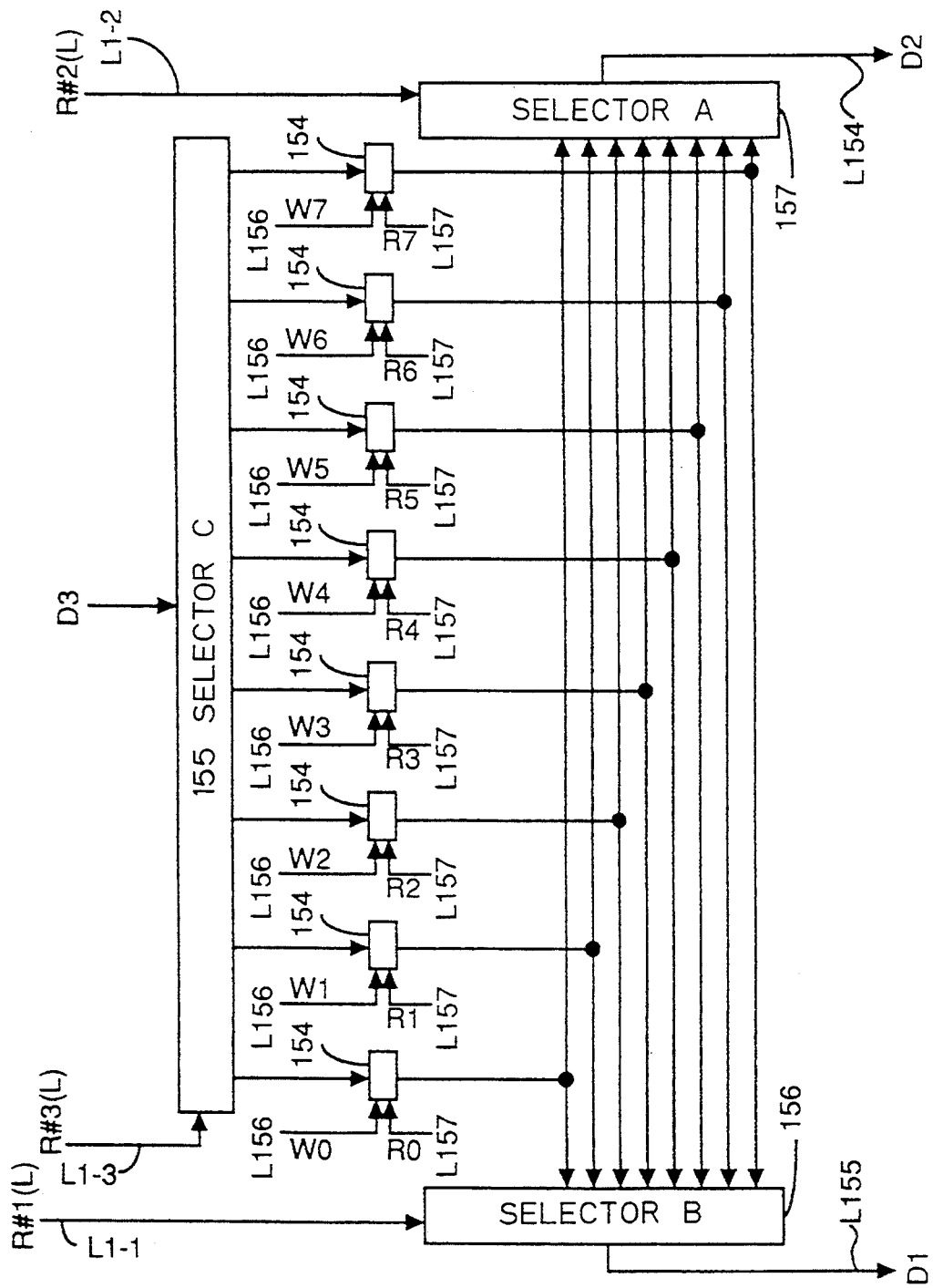
FIG. 3 is a block diagram showing the structure of the register block to be used by the register file shown in FIG. 2.

As shown in FIG. 2, the register file 1 has 13 register blocks (BLK0–BLK12) 151-0–151-12. As shown in FIG. 3, each register block has 8 registers 154. In this embodiment, therefore, the register file 1 has 104 registers in total. Namely, the register file 1 has registers far greater in number than the maximum number 32 of registers which can be designated by the above-described instruction. An access to the register file 1 is performed by using the block number and intra-block register number.

(3-2) Outline of Use Method of Register File 1 in Register Window Mode

Figure 9:
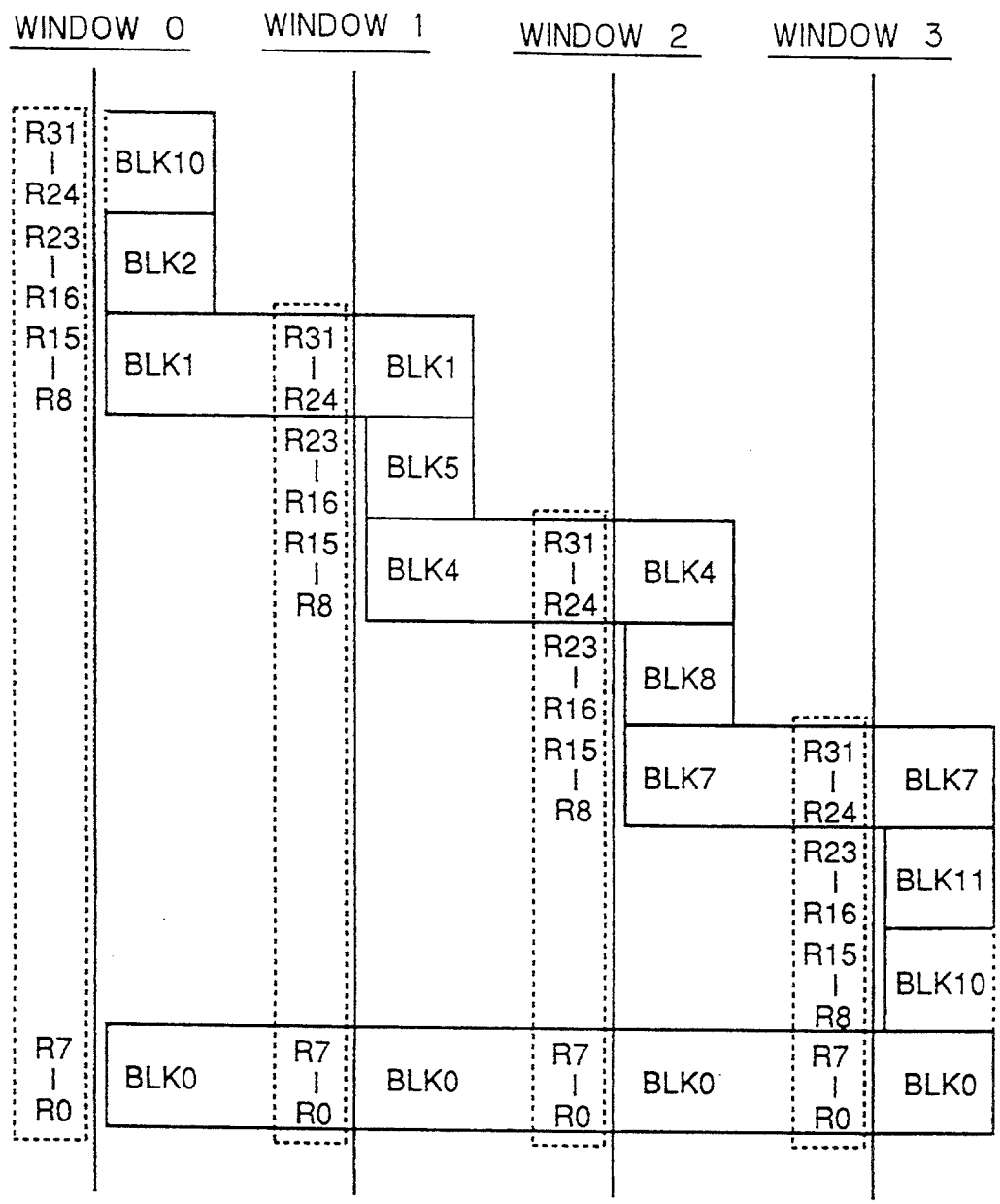
FIG. 9 shows the relationship between logical registers to be designated by instructions and physical registers in the register file allocated to logical registers, when the processor shown in FIG. 1 is used in a register window mode.

In the register window mode, registers in the register file 1 at different positions and within different windows are used as scalar registers. FIG. 9 shows that in each of register windows 0 to 3, as a register among registers (which can be called logical registers) with register numbers R0 to R31 which can be designated by an instruction, a register (which can be called a physical register) belonging to a certain register block is used.

For example, physical registers in the register blocks 0, 1, 2, and 10 are assigned the logical registers R0 to R31 within the register window 0. The eight physical registers #0 to #7 in each register block are sequentially assigned the logical registers in the increasing order of the logical register number. More specifically, the physical registers #0 to #7 within the register block 0 are assigned the logical registers with the numbers R0 to R7 to be designated by instructions, and the physical registers #0 to #7 in the register block 1 are assigned the logical registers R8 to R15.

Similarly, the physical registers in the blocks 0, 4, 5, and 1 are assigned the logical registers R0 to R31 in the register window 1.

Similarly, the physical registers in the blocks 0, 7, 8, and 4 are assigned the logical registers R0 to R31 in the register window 2.

Similarly, the physical registers in the blocks 0, 10, 11, and 7 are assigned the logical registers R0 to R31 in the register window 3.

As appreciated from the foregoing description, the physical registers in the register block 0 are assigned the logical registers R0 to R7 in all the register windows. Therefore, the physical registers of the register block 0 can be used by any one of the register windows, and therefore can be called global registers.

Part of the physical registers assigned larger logical register numbers among the physical registers usable by each register window is the same as those assigned smaller logical register numbers in the register window, one window before the first-mentioned window. Conversely, other part of the physical registers assigned smaller logical register numbers among the physical registers usable by each register window is the same as those assigned larger logical register numbers in the register window, one window next to the first-mentioned window. However, other part of the physical registers assigned intermediate logical register numbers among the physical registers usable by each register window is not assigned the corresponding logical register numbers for the other register windows.

For example, the registers of the register block 1 are assigned the logical registers R24–R31 of the register window 1, and assigned the logical registers R8–R15 of the preceding register window 0. Therefore, the eight physical registers of the register block 1 can be used by both the register windows 1 and 0. Similarly, the registers of the register block 4 are assigned the logical registers R8–R15 of the register window 1, and assigned the logical registers R24–R31 of the succeeding register window 2. Therefore, the eight physical registers of the register block 4 can be used by both the register windows 1 and 2. However, the register block 5 can be used only by the register window 1. As to the order of the register windows, it is assumed that the register window next to the register window 3 is the register window 0 and conversely the register window before the register window 0 is the register window 3.

As seen from FIG. 9, the register blocks 3, 6, 9, and 12 are not used in the register window mode. These register blocks have the registers which are used only in the vector register mode.

(3-3) Outline of Method of Using Register File 1 in Vector Register Mode

In this mode, if the processing mode is the vector processing mode, the register file 1 is used as 8 scalar registers and 24 vector registers each having 4 vector elements.

Figure 10:
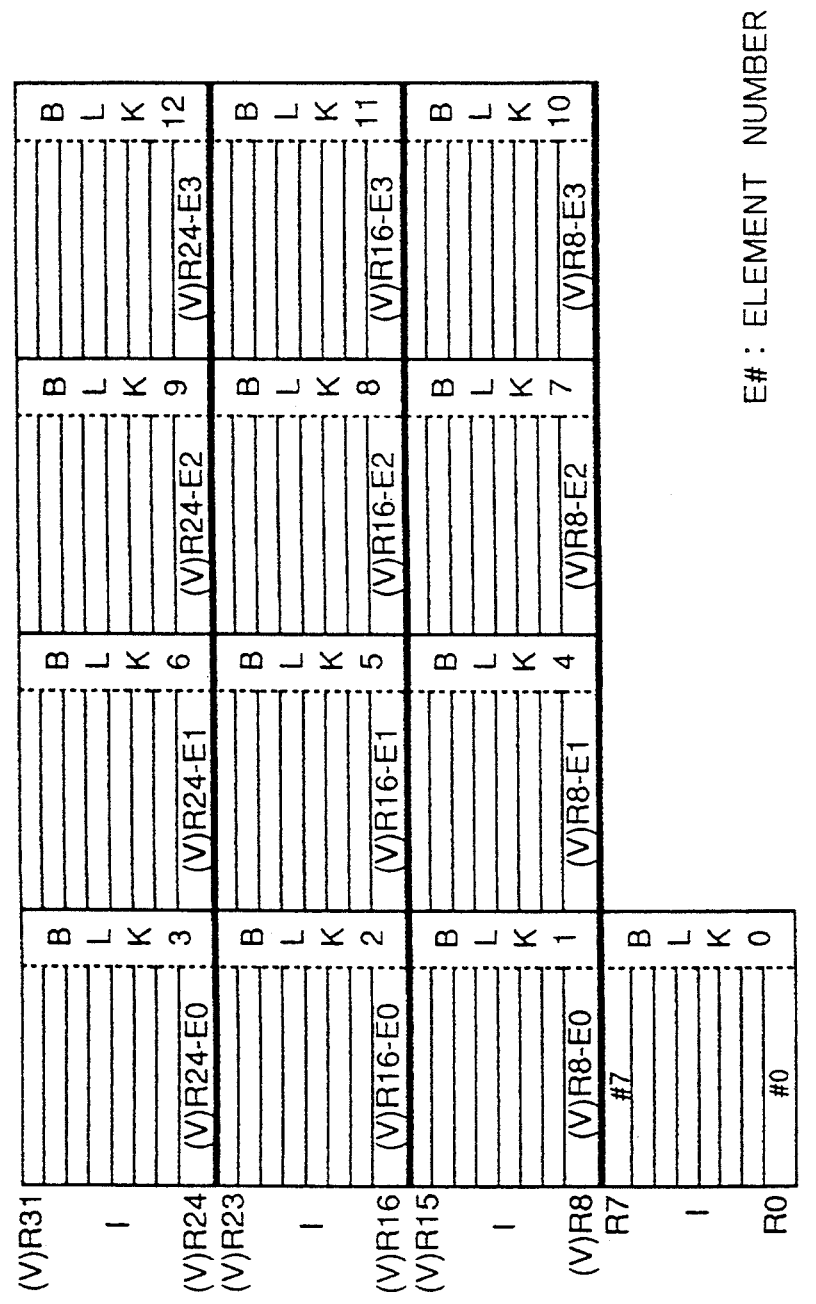

FIG. 10 shows the register numbers to be designated by instructions, and the registers allocated to the register numbers. The register number with (V) at the top thereof means that the register assigned such a number is used as the vector register.

As seen from FIG. 10, the eight physical registers of the register block 0 are designated as the scalar registers corresponding to the logical register numbers R0–R7. The registers of the register blocks 1, 4, 7, and 10 are designated as vector registers corresponding to the logical register numbers R8–R15. For example, four element registers for storing #0–190 3 of the same vector data are used as a vector register corresponding to the logical register number R8, the element registers being positioned at the tops of the four register blocks 1, 4, 7, and 10. Similarly, the register blocks 2, 5, 8, and 10 are used as the vector registers corresponding to the logical register numbers R16–R23, and the register blocks 3, 6, 9, and 12 are used as the vector registers corresponding to the logical register numbers R24–R31. In this manner, the embodiment realizes 24 vector registers each having 4 element registers.

If the register configuration mode is the vector register mode and the processing mode is the scalar processing mode, the register file 1 is used as 32 scalar registers.

Figure 11:
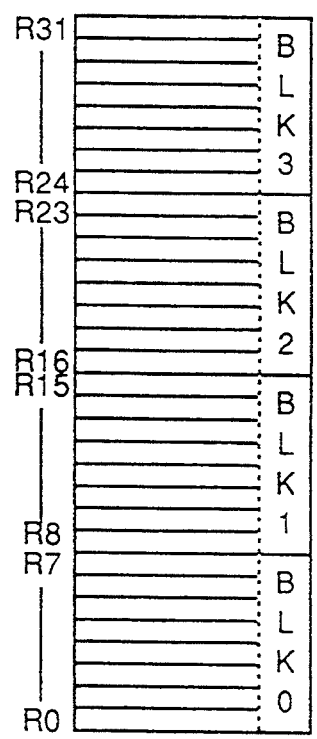
FIG. 11 shows the relationship between logical registers to be designated by instructions and physical registers in the register file allocated to logical registers, when the processor shown in FIG. 1 is used in a scalar processing mode of the vector register mode.

Specifically, as shown in FIG. 11, 32 registers of the register blocks 0, 1, 2, and 3 are used as the scalar registers assigned the logical register numbers R0–R31, and the other registers are not used in this mode.

(4) Details of Operation of Processor in Register Window Mode

Prior to using the register file 1 as the register window configuration, issued is a register window mode setting instruction for declaring the processor that the register file 1 be used as the register window configuration.

The following two types are conceivable for the issuer and issue timing of this setting instruction. The following can be applied to a vector register setting instruction which will be explained later on. The first type is that the issuer is an OS and the issue timing is once before the execution of a user program. With this type, a register configuration most suitable for a user program is selected prior to executing a program. Since the register configuration is not changed during the execution of a user program, it is not necessary to perform an integrity insuring process for which is executed for a possible register value change to be caused by a register configuration change.

The second type is that the issuer is a user program and the issue timing is optional. With this type, since a user program can change the register configuration as desired during executing the program, it is possible to further improve the processing performance. However, in some cases it is necessary to perform the integrity insuring process which is executed for a possible register value change to be caused by a register configuration change, resulting in a tradeoff between the simplicity of use and the processing performance improvement.

Which one of the two types is to be selected, depends on the implementation.

Referring to FIG. 1, when the above-described setting instruction is set in the instruction register 10, it is decoded by the decoder 21 to set the register window mode in the register configuration mode register 2.

An instruction of setting a register window number is issued. When this instruction is set in the instruction register 10, it is decoded by the decoder 21 to set the register window number (called a current window pointer (CWP)) designated by this instruction to the register 8. This program may issue thereafter an instruction of changing the current window pointer (CWP), e.g., an instruction of incrementing or decrementing CWP by "1". When such an instruction is set in the instruction register 10 and decoded by the decoder 21, the decoder 21 instructs the window number modifier 9 to output a new window number WP obtained by incrementing or decrementing CWP in the register 8 by "1". Until such an instruction is issued, the window number modifier 9 continues to output CWP in the register 8 as the window number WP.

(4-1) Operation of Processor When Executing Register Operation Instruction

The description will be given first for the case wherein a program under execution issues the above-described register operation instruction.

As already described, the OP1, OP2, and OP3 fields of the register operation instruction designate first and second operand registers for storing first and second operands to which computation is carried out, and a result register for storing the computation result.

After decoding the instruction in the instruction register 10, the decoder 21 sends the register numbers in the OP1, OP2, and OP3 of the instruction to the register determining circuits 11-13 via lines L2-1, L2-2, L2-3. The decoder 21 also sends the OP code of the instruction to the instruction execution controller 4.

The instruction execution controller 4 generates control signals necessary for the execution of the instruction and different from those generated by the decoder 21, in accordance with the OP code sent from the decoder 21 and the register configuration mode and processing mode stored in the registers 2 and 3. This instruction execution controller includes first and second instruction execution controllers (not shown).

The first instruction execution controller is used for the execution of an instruction which uses the register file 1 not as vector registers but as scalar registers, generates read/write control signals for the register file 1, and sends them to the register file 1 via lines L16–L19. The first instruction execution controller operates when the register configuration mode in the register 2 is the register window mode and when the register configuration mode in the register 2 is the vector register mode and the processing mode in the register 3 is the scalar processing mode.

The second instruction execution controller is used for the execution of an instruction which uses the register file 1 as vector registers, or as vector and scalar registers, generates read/write control signals for the register file 1, sends them to the register file 1 via lines L16–L19, and sends a count-up signal to the element counter 5 only or to both the element counter 5 and the address counter 22. The second instruction execution controller operates when the register configuration mode in the register 2 is the vector register mode and the processing mode in the register 3 is the vector processing mode.

In this example now in concern, the register configuration mode in the register 2 is the register window mode so that the first instruction execution controller operates.

Specifically, the first instruction execution controller outputs register read signals RD1 and RD2 and a register write signal WD to the lines L16, L17, and L18, and, outputs to the line L19 a signal instructing to select output data from ALU 20 as write data.

Each register determining circuit has first and second register determining circuits 14 and 15 which output valid results when the register configuration mode in the register 2 is the register window mode and vector register mode, respectively. The register numbers supplied from the decoder 21 to each of the register determining circuits 11, 12, and 13 are sent to both the first and second register determining circuits which determine the numbers of the physical resisters in the register file 1 to be accessed.

Each register determining circuit also has a selector 16 for selecting outputs of the first and second register determining circuits when the register configuration mode in the register 2 is the register window mode and vector register mode, respectively. The register numbers R# determined by the register determining circuits 11, 12 and 13 are sent to the register file 1 via lines L1-1, L1-2, and L1-3.

In this example now in concern, the register configuration mode in the register 2 is the register window mode so that the first register determining circuit 14 of each register determining circuit 11, 12, 13 becomes valid, and its output is selected by the selector 16.

The first register determining circuit 14 is connected to the window number modifier 9 and the decoder 21. When the register configuration mode is the register window mode, the circuit 14 determines the number of the physical register to be used, among the physical registers within the register file 1, as a scalar register of a logical register number supplied from the decoder 21, within a register window being used by a program under execution, in accordance with the logical register number supplied from the decoder 21 and the register window number WP supplied from the register number modifier 9.

Figure 5:
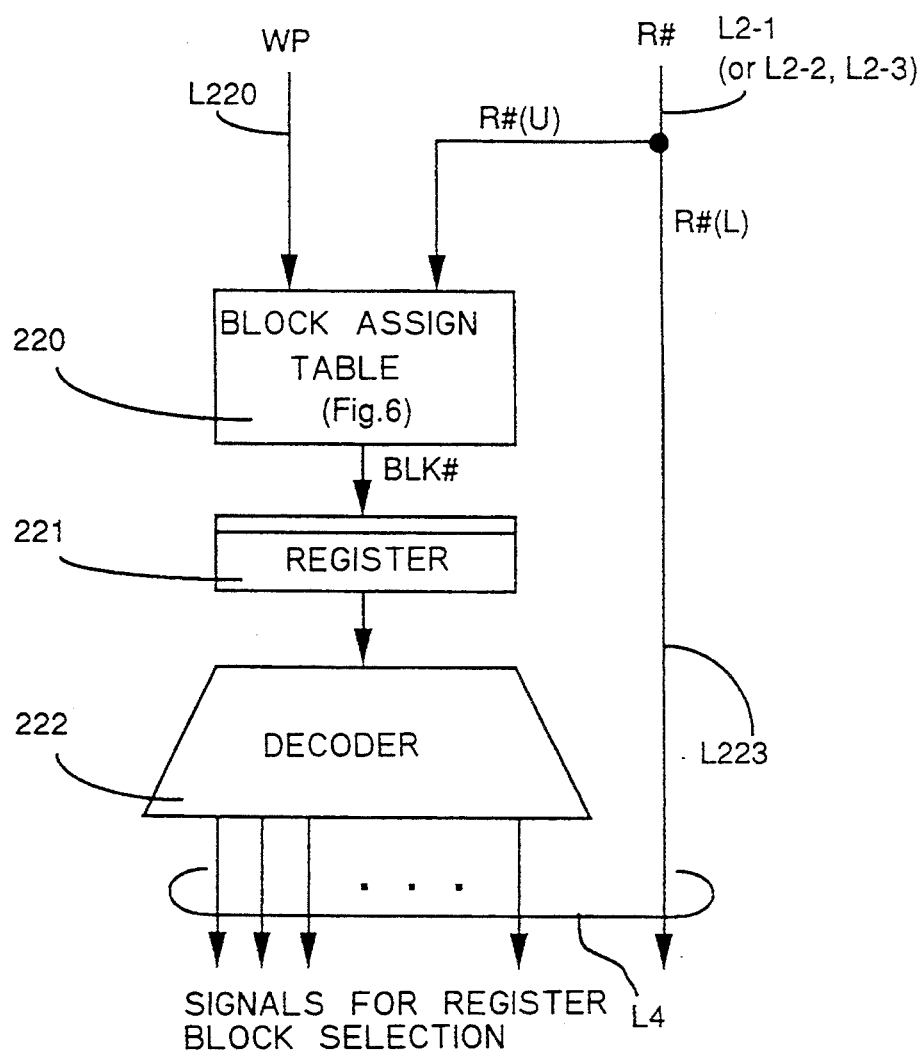
FIG. 5 is a block diagram of the first register determining circuit to be used by the processor shown in FIG. 1.

FIG. 5 shows the details of the first register determining circuit.

Reference numeral 220 represents a table storing the information to be used in determining the number BLK# of a register block to which the physical register to be used belongs, in accordance with a combination of upper two bits of the logical register number R# designated by the instruction and the register window pointer WP.

As already described with reference to FIG. 9, there is the relationship as shown, between the combinations of logical register numbers R# designated by instructions and register window numbers, and the physical registers in the register file 1. As seen from FIG. 9, the eight physical registers belonging to the same register block are assigned consecutive eight logical registers. Therefore, the number of a register block to which the physical register to be used belongs is determined by the upper bit train of the logical register number designated by an instruction and the register window pointer WP. The intra-block register number of the register within the determined block is represented by the lower three bits of the logical register number designated by the instruction. In this embodiment, since the logical register number is assumed to have 5 bits, the upper 2 bits of the logical register number are used for the retrieval of a register block from the table 220.

FIG. 6 shows the details of the table 220. By using this table, the block number BLK# can be determined from the logical register number R# and window pointer WP. Referring to FIG. 5, the block number BLK# thus determined is stored in a register 221. A decoder 222 decodes BLK# to output a register block selection signal corresponding to the register block number. The lower three bits of the logical register number R# designated by the instruction, as well as the selection signal, is outputted as the intra-block register number via a line L4.

In this example, the register configuration mode stored in the register 2 is the register window mode so that the selector 16 selects an output L4 of the first register determining circuit 14 and transfers it to the register file 1.

The operations of the register determining circuits 11–13 are the same as described above. In this embodiment, in the case of the register operation instruction, the register determining circuits 11–13 determine the physical register numbers for the logical register numbers designated by the OP1, OP2, and OP3 fields, and transfer them to the register file 1 via the lines L1-1 - L1-3. The physical registers determined for the logical registers designated by the OP1, OP2, and OP3 fields are the first and second operand registers for storing the first and second operands to be used for the computation requested by the instruction, and the result register for storing the computation result, respectively.

As shown in FIG. 2, in the register file 1, the lower three bits (hereinafter represented by R#1(L) and R#2(L)) of the first and second operand register numbers (hereinafter represented by R#1 and R#2) designated by an instruction are supplied as the intra-block register numbers to the thirteen register blocks BLK0–BLK12 via the lines L1-1 and L1-2.

The lower three bits R#1(L) and R#2(L) of the first and second operand register numbers are also inputted to an R/W controller 100. As detailed in FIG. 4, multiplexers 158-1 and 158-2 of the R/W controller 100 are inputted with the read signals RD1 and RD2 for the first and second operand registers supplied from the instruction execution controller 4 (refer to FIG. 1) via the lines L16 and L17. The multiplexers 158-1 and 158-2 are also inputted with the lower three bits R#1(L) and R#2(L) of the first and second operand register numbers via the lines L1-1 and L1-2. The multiplexer 158-1 generates one of intra-block read signals RD0–RD7 corresponding to R#1(L). The multiplexer 158-2 generates one of intra-block read signals RD0 to RD7 which corresponds to R#2(L). The two intra-block read signals thus generated are sent to each register block via lines L157.

As shown in FIG. 3, the contents of the two registers among the eight registers of each register block supplied with the two intra-block register read signals, are read and selected by selectors 156 and 157 to which the three lower bits R#1(L) and R#2(L) of the first and second operand register numbers are supplied. In this manner, data is read from the registers having the intra-block register numbers corresponding to the lower three bits R#1(L) and R#2(L) of the first and second operand register numbers.

Returning back to FIG. 2, two block selectors 152-1 and 152-2 are provided in the register file 1 for reading two register operands. The selectors 152-1 and 152-2 select the outputs of the blocks with the block numbers BLK#1 and BLK#2 of the first and second operand registers supplied via the lines L1-1 and L1-2. Accordingly, the contents of the first and second operand registers are read parallel by the two block selectors.

The read data is supplied to ALU 20 via the lines L12 and L13, and the calculation result is supplied to the register file 1 via the line L14.

The register file 1 is also provided with a source selector 153. This source selector 153 selects either the data inputted from the memory 17 (refer to FIG. 1) via the line L15 or the data inputted from ALU 20 (refer to FIG. 1) via the line L14, in response to a signal sent from the instruction execution controller 4 (refer to FIG. 1) via the line L19. In this example executing the register operation instruction, the signal on the line L19 makes the source selector 153 select the outputs of ALU 20.

Figure 4:
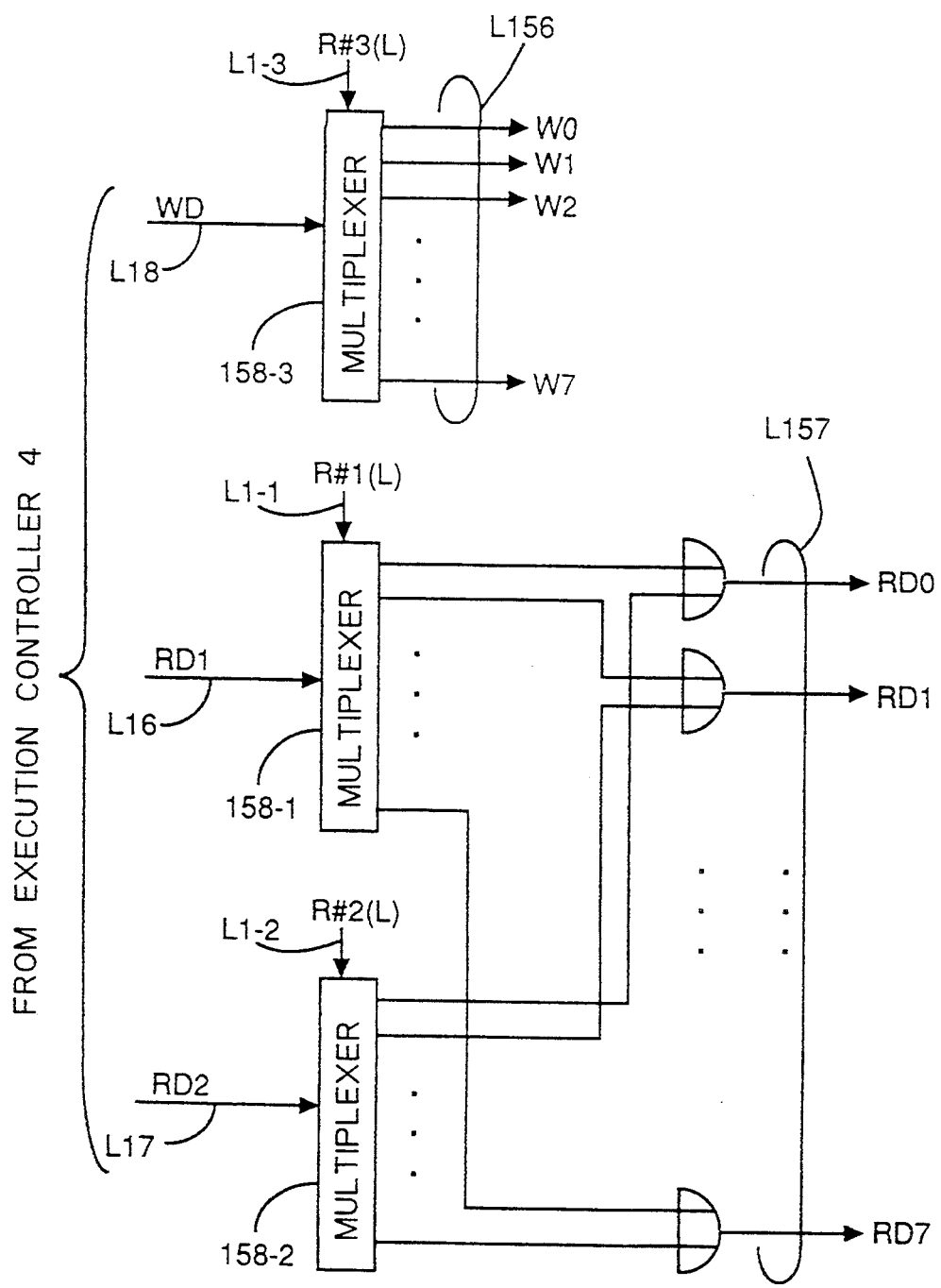
FIG. 4 is a block diagram showing the R/W controller to be used by the processor shown in FIG. 1.

The register file 1 is also provided with a block selector 152-3 to which supplied is a block number BLK#3 for the third operand register number (hereinafter represented by R#3) determined by the register determining circuit 13 (refer to FIG. 1). Therefore, the calculation result data selected by the source selector 153 is selectively supplied to the register block having this block number BLK#3. To each register block, the lower three bits (hereinafter represented by R#3(L)) of the third operand register number R#3 are supplied as the intra-block register number of the third operand register. Also to the R/W controller 100, the register determining circuit 13 (refer to FIG. 1) supplies the lower three bits R#3(L) of the third operand register number R#3. As shown in FIG. 4, the R/W controller 100 has another multiplexer 158-3 which generates one of intra-block write signals W0–W7 corresponding to R#3(L) by using the data write signal WD supplied from the instruction execution controller 4 (refer to FIG. 1) via the line L18, and sends it to each block via a line L156.

The calculation result data is selectively written in the result register determined by the register determining circuit 13 (refer to FIG. 1).

The operations of the processor executing the 10 register operation instruction in the register window mode have been described above.

(4-2) Operation of Processor Executing Load Instruction

As already described, for the load instruction, the OP1–OP4 fields designate the number of a logical base register for storing a base value to be used for the calculation of an address at the memory load position, a shift value to be used for this calculation, and the number of a logical register to be loaded. The field OP4 is not directly related to the present invention, and so the description thereof is omitted.

The decoder 21 decodes the load instruction, sends the OP code to the instruction execution controller 4, sends the base register number to the register number determining circuit 11 via a line L2-1, sends the number of the register to be loaded to the register determining circuit 13 via the line L2-3, and sends the shift value in the instruction to the address generator 19 via a line L2-4. Also in this load instruction, the register determining circuit 11 determines the number of the register from which data is read, and the register determining circuit 13 determines the number of the register to which the data is written. This point is the same as the register operation instruction.

Accordingly, in the following description, only the different points will be described. The data read from the base register is sent not to ALU 20 but to the address generator 19 via the line L12. The data to be loaded in the register is supplied not from ALU 20 but from the memory 17. At the second different point, the source selector 153 shown in FIG. 2 is controlled by instruction execution controller 4 via a line L19 so that the selector 153 selects the data from the memory 17. The register determining circuit 12 is not used by the load instruction.

The address generator 19 generates an address of the data to be loaded, by adding together the shift value supplied from the decoder 21 and the base address read from the register file 1. The address counter 22 is not used by the load instruction.

The description for the store instruction is omitted because the store instruction operation is the same as the load instruction operation except that the data to be stored is read from the register file 1 and written in the memory 17 via the line L12, ALU 20, and line L14.

As appreciated from the foregoing, in the register window mode, registers greater in number than those which can be designated by an instruction can be used, by using the register windows interchangeably.

(5) Details of Processor in Vector Register Mode and in Vector Processing Mode

In order to enter the vector register mode, issued are an instruction of setting the vector register mode in the register configuration mode register 2, and an instruction of setting the processing mode either to the vector processing mode or to the scalar processing mode. When such an instruction is set in the instruction register 10, the decoder 21 sets the mode designated by the instruction in the register configuration mode register 2 and processing mode register 3.

The issuer and issue timing for each of the vector register mode setting instruction and the processing mode setting instruction are the same as described in (4) Details of Operation of Processor in Register Window Mode, and so the description thereof is not duplicated.

In the following, the description will be given first for the case wherein the vector register mode is set in the register 2 and the vector processing mode is set in the register 3.

(5-1) Instruction Allowing to Use Vector Registers As already described with FIG. 10, for this instruction, the register file 1 can be used as having 8 scalar registers and 24 vector registers each having 4 element registers.

When the processor enters the vector register mode and vector processing mode, instructions usable by the processor are a register operation instruction, load instruction, store instruction, and other instructions, like the register window mode already described.

However, different from the register window mode, the register number designated by an instruction is handled as a vector register number in this example under the specific modes. All of a plurality of register numbers designated by an instruction are not handled as the vector register numbers, but part of the register numbers is handled as scalar register number, depending upon the type of the instruction.

For example, the register operation instruction using vector registers has several types.

One of most typical instructions is an instruction of performing a calculation of vector data in the first and second vector registers, and storing the resultant vector data in another vector register. In the following, this type of instruction is called a first type vector register operation instruction. The three register numbers designated by such an instruction are all vector register numbers.

Another register operation instruction using vector registers is an instruction of performing a calculation of vector data in the first register and scalar data in the second register, and storing the resultant vector data in another vector register. In the following, this type of instruction is called a second type vector register operation instruction. The three register numbers designated by such an instruction are two vector register numbers and one scalar register number.

Another register operation instruction using vector registers is an instruction of performing a calculation of vector data in the first and second registers, and storing the resultant scalar data in one of scalar registers. In the following, this type of instruction is called a third type vector register operation instruction. The three register numbers designated by such an instruction are two vector register numbers and one scalar register number.

In this embodiment, of the first to third vector register operation instructions, the first and second vector register operation instructions are adapted to be executable. However, the embodiment can be easily modified so as to execute the third type vector register operation instruction.

In the case of a vector data load instruction, the base register number designated by the load instruction is used for identifying a scalar register, whereas the number of the register in which data is to be loaded is used as a vector register number.

This is also true for the store instruction.

In this embodiment, as appreciated from the description of FIG. 10, whether a register designated by a register operation instruction, a load instruction, or a store instruction is used as the vector register or scalar register is determined from whether or not the number of the resister designated by the instruction is larger than 7 or not.

In case a register of the register number designated by the instruction is to be used a vector register, four physical registers are determined in this embodiment.

(5-2) First Type Vector Register Operation Instruction

The operation of the processor executing the first type vector register operation instruction will be described first. This instruction is an instruction of performing a calculation of vector data in the first and second vector registers, and storing the resultant vector data in another vector register. In the vector register mode and vector processing mode of the processor, when the register operation instruction is set in the instruction register 10, the decoder 21 decodes the instruction in the similar manner to the register window mode, the OP code of the instruction is sent to the instruction execution controller 4, and the first and second operand register numbers and result register number designated by the instruction are sent to the register determining circuits 11, 12, and 13.

In response to that the register configuration mode and processing mode in the registers 2 and 3 indicate the vector register mode and vector processing mode, respectively, and that the OP code of the instruction indicates the register operation instruction, the instruction execution controller 4 sequentially outputs four read signals to the register file 1 via line L16, the four read signals instructing to read four vector elements in the first vector register. Synchronously with the four read signals, the instruction execution controller 4 also sequentially outputs other four read signals to the register file 1 via the line L17, these four signals instructing to read four vector elements in the second vector register.

After a predetermined time lapse from the output of these two sets of read signals, the instruction execution controller 4 sequentially outputs four write signals to the register file 1 via the line L18, the four write signals indicating to write the calculation result to a result vector register. This predetermined time lapse is preset in accordance with the calculation time of ALU 20 required by the instruction.

Synchronously with the output of the second to fourth read signals of the two sets of the read signals, the instruction execution controller 4 outputs a count-up signal to the element counter 5. Since the initial value of the element counter 5 has been set to 0, it sequentially outputs the element numbers 0, 1, 2, and 3 of the vector data. The element numbers E# outputted by the element counter 5 are supplied to the second register determining circuits 15 within each of the three register determining circuits 11, 12, and 13.

Using one logical register number R# designated by the instruction in the instruction register 10 and each element number E# supplied from the element counter 5, the second register determining circuit 15 of each register determining circuit 11, 12, or 13 determines the physical register to be used as the element register corresponding to the element number E# and constituting the vector register corresponding to the logical register number.

Figure 7:
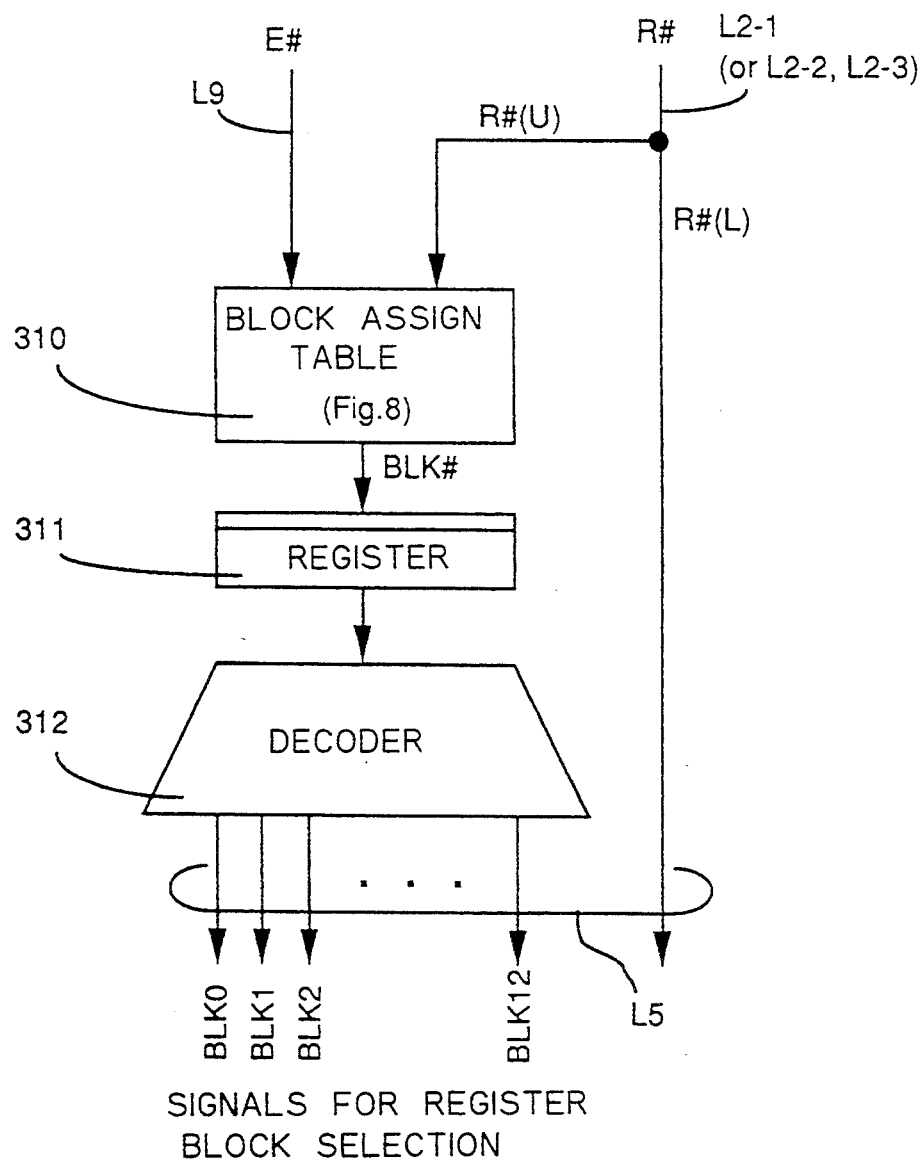
FIG. 7 is a block diagram showing the second register determining circuit to be used by the processor shown in FIG. 1.

FIG. 7 shows the details of the second register determining circuit 15. The relationship between logical register numbers R# designated by instructions and physical registers in the register file 1 assigned the logical register numbers, in the vector register mode and vector processing mode of the processor, has already been described with FIG. 10.

As seen from FIG. 10, if the physical register assigned the logical register number R# designated by an instruction is a vector register, four registers in four register blocks having the same intra-block number are used. In this embodiment, it is to be noted that the numbers of the four register blocks are determined from the upper bit train R#(U) (upper two bits in this embodiment) of the logical register number R# and the element numbers E# of the vector data.

A block assign table 310 shown in FIG. 7 stores the information representing the relationship between element numbers E# and upper bit trains R#(U). From this table the block numbers BLK# to which registers to be used belong are outputted by using the upper bit train R#(U) of the logical register number R# and the element numbers E# of the vector data. FIG. 8 is a table showing the relationship between the upper bit trains R#(U) and element numbers E#. In this embodiment, four block numbers are sequentially determined by this table 310 using the register number designated by the instruction and the element numbers outputted from the element counter 5 (refer to FIG. 1).

In this embodiment, the intra-block numbers of registers in the four blocks are the same number as that represented by the lower bit train R#(L) (lower three bits in this embodiment) of the logical register number R# designated by an instruction. Therefore, the lower bit train R#(L) itself is supplied to the register file 1. This operation is the same as the first register determining circuit. Each of the four block numbers determined by the table 310 is sent to a decoder 312 via a register 311. This decoder 312 generates a block selection signal corresponding to the inputted block number. In summary, according to this embodiment, in the vector register mode and vector processing mode of the processor, four physical register numbers are sequentially selected by using the logical register number designated by an instruction and element numbers designated by the element counter 5. Selection of a register block selection signal by the decoder 312 is the same as already described with the operation of the register window mode.

The selector 16 (refer to FIG. 1) selects the outputs of the second register determining circuit determined in the manner described above to the register file 1, when the register 2 indicates the vector register mode. The operation of the register file 1 in response to the outputs from the second register determining circuit becomes apparent from the already-described operation of the register window mode, and so the description is omitted.

As described above, for the first type vector register operation instruction, four vector element data are sequentially read as the vector element data from the four registers constituting the first vector register supplying the operands, and supplied to ALU 20. Synchronously with reading these vector element data, four vector element data are sequentially read as the vector element data from the four registers constituting the second vector register supplying the operand, and supplied to ALU 20. ALU 20 executes in a pipeline manner a calculation, designated by the instruction, of each pair of the four pairs of the vector element data read from the two vector registers. The four resultant vector elements are sequentially written in the four registers constituting the result vector register designated by the instruction.

The operation of the processor when executing the first type vector register operation instruction has been described above.

(5-3) Second Type Vector Register Operation Instruction

For the second type vector register operation instruction, the single register for supplying an operand is used as a scalar register. To this end, the number of the register to be used as the scalar register and designated by the instruction is set to any one of 0 to 7. As seen from FIG. 10, a register of the register block 0 is used. Of the three register numbers designated by the instruction, the number of the register to be used as the scalar register is supplied to the register determining circuit, e.g., the register determining circuit 12. The second register determining circuit 15 of the register determining circuit 12 determines the physical register to be used, from the register number designated by the instruction and each of the four element numbers supplied from the element counter 5, in the same manner described above.

However, in the case where the register number designated by the instruction is one of 0 to 7, the register block number is determined to be 0 as seen from FIG. 8, depending upon the register number determined by the instruction and irrespective of the values of the four element numbers. Therefore, although the element number changes, the same scalar data is sequentially read from the register of the block 0 having the intra-block register number same as the register number designated by the instruction.

The numbers of the other register designated by the instruction is assigned a vector register of four vector element registers, like the already-described first type vector register operation instruction, and the vector element data is sequentially read therefrom. ALU 20 executes a calculation of each pair of vector element data and scalar data read from the scalar register. The resultant vector is stored in the vector register, in the same manner as described with the first vector register operation instruction.

(5-4) Vector Data Load Instruction

As already described, with this instruction, there are designated a base register number, a shift value to be used for address calculation, and the number of the register in which vector data is stored. Since the base register is a scalar register, this register number is required to be one of 0 to 7. Conversely since the register to be loaded is a vector register, this register number is required to be one of 8 to 31.

The instruction decoder 21 decodes the load instruction set in the instruction register 10, and supplies the shift value designated by the instruction to the address generator 19. The instruction decoder 21 also supplies the base register number and the number of the vector register to be loaded, respectively designated by the instruction, to the register determining circuits 11 and 13, respectively, and supplies the OP code of the instruction to the instruction execution controller 4.

Similar to the first and second type vector register operation instructions, the instruction execution controller 4 supplies four read signals to the line L16, four write signals to the line L18, and three count-up signals to the element counter 5. The instruction execution controller 4 also supplies a count-up signal to the address counter 22 for the execution of the load instruction.

The initial value of the address counter 22 is 0. Each time a count-up signal is supplied, this counter 22 counts up its count corresponding in number to the length of each vector element data, e.g., by four bytes. The address counter 22 sequentially generates counts corresponding to 0, 4, 8, and 12 bytes.

Like the scalar register number designated by the second type vector register operation instruction, the register determining circuit 11 supplied with the base register number sequentially reads the base value to be used for address calculation from the register in the register block 0 having the intra-block register number same as the register number designated by the instruction. However, different from the second type vector register operation instruction, the read-out base value is supplied not to ALU 20 but to the address generator 19 via the line L12.

The address generator 19 generates a memory address by adding together the shift value designated by the load instruction and supplied from the decoder, the base value read out of the base register in the register file 1, and an output of the address counter 22, to supply the memory address to the memory 17. Specifically, the address generator 19 generates first the start element address of the vector data to be loaded by adding the shift value and the base address, and thereafter generates the succeeding three element addresses of the start element address+4 bytes, start element address+8 bytes, and start element address+12 bytes.

Four vector elements are sequentially read from the memory 17 at these addresses, and supplied to the register file 1 via the line L15.

The register determining circuit 13 supplied with the load destination register number from the decoder 21 determines four physical registers constituting the vector register assigned to the load destination register number, in the similar manner to the first type vector register operation instruction.

Written in the determined four physical registers is the vector data read from the memory 17.

(5-5) Vector Data Store Instruction

With this instruction, the number of the vector register for storing vector data is designated without designating the number of the load destination register designated by a load instruction. The operation of the processor is essentially the same as a vector data load instruction except that vector data is read from the vector register and is stored in the memory 17, and so the description thereof is omitted.

The operation of the processor in the vector register mode and vector processing mode has been described above.

(6) Operation of Processor in Vector Register Mode and Scalar Processing Mode

Even in this mode, it is possible to execute a register operation instruction, a load instruction, or a store instruction.

As already described with FIG. 11, in the vector register mode and scalar processing mode, all the register numbers designated by an instruction are handled as scalar register numbers.

As will be understood from the comparison between FIGS. 10 and 11, the relationship in this mode between the register number designated by an instruction and the physical register in the register file 1 is the same as the relationship, in the vector processing mode with the vector element number 0, between the register number designated by an instruction and the physical register in the register file 1. Therefore, even in the scalar processing mode, the second register determining circuit 15 of each register determining circuit 11, 12, 13 shown in FIG. 1 can be used.

Specifically, when the processing mode register 3 indicates the scalar processing mode, the instruction execution controller 4 performs, upon reception of the OP code of the instruction from the decoder 21, the operation same as the already-described register window configuration mode. Namely, the controller 4 outputs read signals and a write signal to the lines L16, L17, and L18, respectively, and outputs to the line L19 a signal which discriminates between writing resultant data outputted from ALU 20 and writing resultant data read from the memory 17. A count-up signal is not supplied to the element counter 5 and address counter 22.

The second register determining circuit of each register determining circuit 11, 12, 13 therefore performs the operation like that in the already-described vector register operation instruction or vector register load instruction with the element number 0.

As a result, it is possible to determine the physical register from the register number designated by the instruction, basing upon the relationship shown in FIG. 11. The other operations are the same as those in the register window mode, and so the detailed description thereof is omitted.

(Modification 1)

In the above embodiment, in the vector register mode, ALU 20 of a pipeline type performs in a pipeline, manner calculations of a plurality of vector elements sequentially read from four registers constituting one vector register, and resultant four vector elements are sequentially written in four registers constituting one vector register.

However, in order to speed up the calculations of four vector elements, the calculations may be executed in parallel.

To this end, four ALUs 20 are used, the instruction execution controller 4 is structured so as to output in the vector processing mode four read or write signals in parallel, and the element counter 5 is omitted.

Furthermore, in the vector processing mode, the second register determining circuit 15 of each register determining circuit 11, 12, 13 is structured so as to output in parallel a set of physical register numbers determined by using each of the four block numbers for the four columns shown in FIG. 8 and the lower bit train of the logical register number designated by an instruction. In the scalar processing mode, the second register determining circuit is structured so as to output a physical register number determined by using the block number for the column with the element number E# of 0 shown in FIG. 8 and the lower bit train of the logical register number designated by an instruction.

Furthermore, the register file 1 is structured so as to respond to read or write signals supplied in parallel from the instruction execution controller 4 and a plurality of block numbers and the intra-block register number supplied in parallel from the second register determining circuit of each register determining circuit 11, 12, 13, and to read or write four vector elements in parallel. Still further, in loading vector data from the memory 17 in parallel or in storing vector data to the memory 17 in parallel, the address counter 22 shown in FIG. 1 is omitted, and the address generator 19 is structured so as to output in parallel four memory addresses for loading or storing four vector elements.

(Modification 2)

In the above embodiment, registers of the register file 1 are divided into a plurality of register blocks, and the register block number and intra-block register number are determined by each register determining circuit. With such a configuration of the register file, the first and second register determining circuits can determine the range of physical register numbers by using the upper bits of a supplied logical register number, simplifying the circuit structure. With this configuration, however, all registers in the same register block are required to be used either as element registers of vector registers or as scalar registers. Also with the register window configuration, the number of global registers and the number of physical registers shared in common by adjacent two windows are limited to the number of physical registers of the same register block.

The above problems can be solved if the configuration unit of a register block is not used. This can be realized by connecting the block selectors 152-1, 152-2, and 152-3 shown in FIG. 2 to all physical registers.

In this case, the physical register number PR# can be determined by each of the register determining circuits 11 to 13 from the logical register number R# designated by an instruction, through calculation of the following formulas wherein the element number outputted by the element counter 5 is represented by E# and the window pointer is represented by WP.

(1) Formula for the determination of a register number by the first register determining circuit 14.
(Assuming that the number of global registers is 8, and the number of physical registers shared in common by two adjacent windows is 8)

$0 \leq R\# \leq 7 \quad PR\# = R\#$ $8 \leq R\# \leq 31 \quad PR\# = ((R\# + WP * 16 - 8), \text{modulo } 64) + 8$ (2) Formula for the determination of a register number by the second register determining circuit 15.
(Assuming that the number of scalar registers is 8, and the number of vector registers is 24)

$0 \leq R\# \leq 7 \quad PR\# = R\#$ $8 \leq R\# \leq 31 \quad PR\# = R\# + E\# * 24$ (Modification 3)

In the above-described embodiment, the processing mode of the vector register mode is determined by using the processing mode setting instruction so that the same setting instruction can be used for both the vector and scalar processing modes. There is advantageous in that only the processing setting mode instruction is sufficient for practicing the present invention.

If different OP codes are used for the vector processing instruction and scalar processing instruction, the processing mode can be identified by the decoder 21.

In this case, it is advantageous in that it is not necessary to use the processing mode setting instruction and the processing mode register 3. It is also possible to setting the processing mode as desired.

According to the present invention, the same register file can be used as scalar register groups for a plurality of register windows and as a plurality of vector registers.

What is claimed is:

1. An information processing apparatus for executing a first type program which uses a plurality of groups of scalar registers with each group being assigned to a plurality of register windows and a second type program which uses a plurality of vector registers, comprising:

a predetermined number of registers for realizing said plurality of groups of scalar registers and said plurality of vector registers, said predetermined number of registers including a plurality of registers each of which is used both as a scalar register of said plurality of groups of scalar registers and as an element register of a plurality of groups of element registers, each group of element registers constituting one vector register of said plurality of vector registers;

a holding means for holding a register window number designated by said first type program under execution with respect to said predetermined number of registers;

a first determining circuit connected to said holding means and responsive to an instruction using at least one register and issued by said first type program under execution, for determining, from said predetermined number of registers, one register to be used as a scalar register of a register number designated by said instruction within a register window having a held said register window number;

a second determining circuit connected to said holding means and responsive to an instruction using at least one register and issued by said second type program under execution, for determining, from said predetermined number of registers, a group of registers to be used as a group of element registers constituting a vector register of a register number designated by said instruction; and an access circuit connected to said first and second determining circuits for accessing said one register of said predetermined number of registers as determined by said first determining circuit and said group of registers of said predetermined number of registers as determined by said second determining circuit in accordance with a selected one of a scalar register mode and a vector register mode.

2. An information processing apparatus according to claim 1, further comprising:

an indicating means for indicating whether a processing mode of said information processing apparatus is a processing mode using a register window, wherein said access circuit includes a circuit for accessing said one register determined by said first determining circuit when said indicating means designates said processing mode using a register window, and for accessing said group of registers determined by said second determining circuit when said indicating means does not designate said processing mode using a register window.

3. An information processing apparatus according to claim 1, wherein:

said first determining circuit includes a plurality of first type determining circuits operating in parallel;

each first type determining circuit includes a circuit responsive to each of a plurality of register numbers designated by an instruction designating a plurality of registers and issued by said first type program, for determining, from among said predetermined number of registers, one register to be used as a scalar register of said register number within the register window having said stored register window number;

said second determining circuit includes a plurality of second type determining circuits operating in parallel;

each second type determining circuit includes a circuit responsive to one of a plurality of register numbers designated by an instruction designating a plurality of registers and issued by said second type program, for determining, from among said predetermined number of registers, a group of registers to be used as a group of element registers constituting a vector register of said register number; and said access circuit includes a circuit for parallelly accessing a plurality of registers determined by said plurality of first type determining circuits and parallelly accessing a plurality group of registers determined by said plurality of second type determining circuits.

4. An information processing apparatus according to claim 3, further comprising:

an output means responsive to an instruction issued by said second type program for sequentially outputting the element numbers of a group of element registers constituting a vector register, wherein said second type determining circuit includes a circuit connected to said output means for sequentially determining said group of registers by using combinations each of one register number along a plurality of register numbers designated by said instruction and one of the element numbers of said group of element registers sequentially outputted by said output means.

5. An information processing apparatus according to claim 4, wherein each said second type determining circuit includes:

a conversion table for converting a combination of a register number designated by an instruction and the number of an element register, into a register number of one register among said predetermined number of registers; and a circuit for sequentially converting a plurality of combination data into the numbers of said group of registers by repetitively using said conversion table, each combination data having the register number designated by an instruction issued by said second type program and one of the element numbers sequentially outputted by said output means.

6. An information processing apparatus according to claim 3, further comprising a pipe line operation circuit connected to said predetermined number of registers, and wherein said access circuit includes:

a supplying means for supplying to said operation circuit parallel contents of first and second registers determined by first and second ones of said plurality of first type determining circuits and writing an operation result supplied from said operation circuit into a third register determined by a third one of said plurality of first type determining circuits; and a sequential supply means sequentially supplying to said operation circuit contents of a first group of registers determined by a first one of said plurality of second type determining circuits and sequentially supplying to said operation circuit in parallel contents of a second group of registers determined by a second one of said plurality of second type determining circuits in parallel to the supply of the contents of said first group of registers and for sequentially writing a plurality of operation results sequentially supplied from said operation circuit into a third group of registers determined by a third one of said plurality of second determining circuits.

7. An information processing apparatus according to claim 3, further comprising:

a main storage memory; and an address generating circuit connected to said predetermined number of registers for generating addresses of said main storage memory to access said main storage memory with the generated addresses, and wherein said access circuit includes:

a data supplying means for supplying to said address generating circuit first data held in a first register determined, for the instruction issued from said first type program for loading data from said main storage memory, by a first one of said plurality of first type determining circuits; and a sequential supplying means for sequentially supplying to said address generating circuit a first set of data held in a first group of registers determined, for the instruction issued from said second type program for loading data from said main storage memory, by a first one of said plurality of second type determining circuits, and wherein said address generating circuit further includes:

an address generating means for generating an address for second data stored in said main storage memory based on the first data supplied from said access circuit and reading out the second data from said main storage memory based on the generated address; and an address supplying means for sequentially generating a group of addresses for second set of data stored in said main storage memory based on the first set of data supplied from said access circuit and sequentially reading out the second set of data from said main storage memory based on the generated group of addresses, and wherein said access circuit further includes:

a writing means for writing the read out second data into the second register determined for the instruction issued from said first type program by said second type determining circuit; and a sequential writing means for sequentially writing the read out second set of data into the second group of registers determined for the instruction issued from said second type program by said second type determining circuit.

8. An information processing apparatus according to claim 3, further comprising:

a main storage memory; and an address generating circuit connected to said predetermined number of registers for generating addresses of said main storage memory to access said main storage memory with the generated addresses, and wherein said access circuit includes:

a data supplying means for supplying to said address generating circuit first and second data held in first and second registers determined, for the instruction issued from said first type program for storing data in said main storage memory, by first and second ones of said plurality of first type determining circuits; and a sequential supplying means for sequentially supplying to said address generating circuit first and second sets of data respectively held in first and second groups of registers determined, for the instruction issued from said second type program for storing data in said main memory, by first and second ones of said plurality of second type determining circuits, and wherein said address generating circuit further includes:

an address generating means for generating an address for storing the second data in said main storage memory based on the first data supplied from said access circuit and writing the second data in said main storage memory based on the generated address; and an address supplying means for sequentially generating a group of addresses for storing the second set of data stored in said main storage memory based on the first set of data supplied from said access circuit and sequentially writing the second set of data in said main storage memory based on the generated group of addresses.

9. An information processing apparatus according to claim 3, further comprising a plurality of operation circuits connected to said predetermined number of registers for executing an operation for a plurality of data in parallel, and wherein said access circuit includes:

a first content supplying means for supplying to one of said operation circuits in parallel contents of first and second registers determined by first and second ones of said plurality of first type determining circuits;

a first operation result writing means for writing an operation result supplied from said one operation circuit into a third register determined by a third one of said plurality of first type determining circuits;

a second content supplying means for supplying to said plurality of operation circuits in parallel contents of a first group of registers determined by a first one of said plurality of second type determining circuits and supplying to said plurality of operation circuits in parallel contents of a second group of registers determined by a second one of said plurality of second type determining circuits in parallel to the supply of the contents of said first group of registers; and a second operation result writing means for writing a plurality of operation results supplied in parallel from said plurality of operation circuits into a third group of registers determined by a third one of said plurality of second determining circuits.

10. An information processing apparatus according to claim 3, further comprising:

a main storage memory; and an address generating circuit connected to said predetermined number of registers for generating an address of said main storage memory to access said main storage memory with the generated address, and wherein said access circuit includes:

a first data supplying means for supplying to said address generating circuit first data held in a first register determined, for the instruction issued from said first type program for loading data from said main storage memory, by a first one of said plurality of first type determining circuits; and a second data supplying means for supplying to said address generating circuit in parallel a first set of data held in a first group of registers determined, for the instruction issued from said second type program for loading data from said main storage memory, by a first one of said plurality of second type determining circuits, and wherein said address generating circuit further includes:

a data address generating means for generating an address for second data stored in said main storage memory based on the first data supplied from said access circuit and reading out the second data from said main storage memory based on the generated address; and a group address generating means for generating a group of addresses for second set of data stored in said main storage memory in parallel based on the first set of data supplied from said access circuit and reading out the second set of data in parallel from said main storage memory based on the generated group of addresses, and wherein said access circuit further includes:

a first data writing means for writing the read out second data into a second register determined for the instruction issued from said first type program by said first type determining circuit; and a second data writing means for writing the read out second set of data in parallel into a second group of registers determined for the instruction issued from said second type program by said second type determining circuit.

11. An information processing apparatus according to claim 3, further comprising:
a main storage memory; and
an address generating circuit connected to said predetermined number of registers for generating an address of said main storage memory to access said main storage memory with the generated address, and wherein said access circuit includes:
a first data supplying means for supplying to said address generating circuit first and second data held in first and second registers determined, for the instruction issued from said first type program for storing data in said main storage memory, by first and second ones of said plurality of first type determining circuit; and
a second data supplying means for supplying to said address generating circuit in parallel first and second sets of data respectively held in first and second groups of registers determined, for the instruction issued from said second type program for storing data in said main storage memory, by first and second ones of said plurality of second type determining circuits, and
wherein said address generating circuit further includes:
a data address generating means for generating an address for storing the second data in said main storage memory based on the first data supplied from said access circuit and writing the second data in said main storage memory based on the generated address; and
a group address generating means for generating a group of addresses for storing the second set of data stored in said main storage memory in parallel based on the first set of data supplied from said access circuit and writing the second set of data in parallel in said main storage memory based on the generated group of addresses.

12. An information processing apparatus according to claim 1, wherein:
said second determining circuit includes a circuit for sequentially determining said group of registers in the order of element numbers of a group of element registers constituting a vector register; and
said access circuit includes a circuit for sequentially accessing said group of registers sequentially determined.

13. An information processing apparatus according to claim 12, further comprising:
an output means responsive to an instruction issued by said second type program for sequentially outputting the element numbers of a group of element registers constituting a vector register,
wherein said second determining circuit includes a circuit for sequentially determining said group of registers by using combinations each of the register number designated by said instruction and one of the element numbers of said group of element registers sequentially outputted by said output means.

14. An information processing apparatus according to claim 13, wherein said second determining circuit includes:
a conversion table for converting each of the combinations each of a register number designated by said instruction and one of the numbers element of the group of element registers, into a register number of one register among said predetermined number of registers; and
a circuit for sequentially converting a plurality of combination data into register numbers of said group of registers by repetitively using said conversion table, each said combination data having the register number designated by an instruction issued by said second type program and one of the element numbers sequentially outputted by said output means.

15. An information processing apparatus according to clam 1, wherein:
said second determining circuit includes a circuit for parallelly determining said group of registers; and
said access circuit includes an access circuit for parallelly accessing said group of registers parallelly determined.

16. An information processing apparatus according to claim 15, wherein said second determining circuit includes a conversion table for parallelly converting a register number designated by an instruction into the register numbers of a group of registers in said predetermined number of registers.

17. An information processing apparatus according to claim 1, wherein said second determining circuit includes a circuit for determining, when a register number designated by the instruction issued from the second type program is not coincident with any of a plurality of register numbers of a predetermined number, the group of registers to be used as the vector register of the register number from said predetermined number of registers and determining, when the register number designated by the instruction is coincident with any of the plurality of register numbers, one register to be used as a scalar register of the register number from said predetermined number of registers.

18. An information processing apparatus according to claim 17, wherein said second determining circuit includes a plurality of second type determining circuits operating in parallel to each other,
wherein said information processing apparatus further comprises an output means for sequentially outputting element numbers of the group of element registers constituting the vector register in response to the instruction issued from the second type program, wherein each of said second type determining circuits includes a circuit connected to said output means and responsive to a set of said one of the plurality of register numbers designated by the instruction issued from the second type program and the element numbers of the group of element registers sequentially outputted from said output means, for sequentially determining, when the register number designated by the instruction is not coincident with any of the plurality of register numbers of the predetermined number, the group of registers to be used as the vector register of the register number from said predetermined number of registers, and repeatedly determining, when the register number designated by the instruction is coincident with any of the plurality of register numbers, the one register to be used as the scalar register of the register number from said predetermined number of registers, not dependent upon the element numbers outputted from said outputting means, and wherein said access circuit includes a circuit for sequentially accessing the group of registers when the group of registers to be used as the vector register are sequentially determined by said each second type determining circuit and repeatedly accessing the one register when the one register to be used as the scalar register is repeatedly determined by said each second type determining circuits.

19. An information processing apparatus according to claim 1, further comprising an instructing means connected to said second determining circuit for instructing execution of either a vector process or a scalar process during execution of the second type program, and wherein said second determining circuit includes a circuit for determining the group of registers when said instructing means instructs the execution of the vector process and the one register to be used as the scalar register of the register number designated by the instruction issued from said second type program when said instructing means instructs the execution of the scalar process, and wherein said access circuit includes a circuit for accessing the group of registers when said second determining circuit determines the group of registers and accessing the one register when said second determining circuit determines the one register.

20. An information processing apparatus according to claim 19, further comprising an outputting means connected to said second determining circuit, for sequentially outputting the element numbers of the element registers constituting the vector register in response to the instruction issued from the second type program, and wherein said second determining circuit includes a circuit for sequentially determining the group of registers in an order of element numbers outputted from said outputting means when said instructing means instructs execution of the vector process and determining the one register to be used as the scalar register of the register number designated by the instruction issued from said second type program from among said predetermined number of registers, and wherein said access circuit includes a circuit for accessing the group of registers when said instructing means instructs the execution of the vector process and accessing the one register when said instructing means instructs the execution of the scalar process.

21. An information processing apparatus according to claim 1, wherein said second type program includes a vector instruction defined to designate the number of the vector register as the register number and a scalar instruction defined to designate the number of the scalar register not designating the number of the vector register, wherein said second determining circuit includes a circuit for determining the group of registers in response to the vector instruction issued from said second type program and determining from among said predetermined number of registers, the one register to be used as the scalar register of the register number designated by the scalar instruction, and when said access circuit includes a circuit for accessing the group of registers when said second determining circuit determines the group of registers and accessing the one register when said second determining circuit determines the one register.

22. An information processing apparatus according to claim 1, further comprising a pipe line operation circuit connected to said predetermined number of registers, and wherein said access circuit includes a supplying means for supplying to said operation circuit a content of the one register determined by said first determining circuit and sequentially supplying to the operation circuit contents of the group of registers determined by said second determining circuit.

23. An information processing apparatus according to claim 1, further comprising a pipe line operation circuit connected to said predetermined number of registers, and wherein said access circuit includes a writing means for writing an operation result supplied from said operation circuit into the one register determined by said first determining circuit and sequentially writing a plurality of operation results supplied from said operation circuit into the group of registers determined by said second determining circuit.

24. An information processing apparatus according to claim 1, further comprising a plurality of operation circuits connected to said predetermined number of registers for executing an operation for a plurality of data in parallel, and wherein said access circuit includes:
a first content supplying means for supplying to one of said operation circuits a content of the one register determined by said first determining circuit; and
a second content supplying means for supplying to the operation circuits in parallel contents of the group of registers determined by said second determining circuit.

25. An information processing apparatus according to claim 1, further comprising a plurality of operation circuits connected to said predetermined number of registers for executing an operation for a plurality of data in parallel, and wherein said access circuit includes:
a first operation writing means for writing an operation result supplied from one of said operation circuits into the one register determined by said first determining circuit; and
a second operation writing means for writing a plurality of operation results supplied in parallel from said plurality of operation circuits into the group of registers determined by said second determining circuit in parallel.

26. An information processing apparatus as claimed in claim 1, further comprising:
an operation mode designating means for designating whether a vector process or a scalar process is to be performed.

27. An information processing apparatus as claimed in claim 1, further comprising:
a select means for selecting one of a vector process and a scalar process as an operation mode in accordance with a type of instruction to be executed.

* * * * *